122,371

UNITED STATES PATENT OFFICE.

GEORGE A. DRUMMOND AND THOMAS STERRY HUNT, OF MONTREAL, CANADA.

IMPROVEMENT IN THE MANUFACTURE OF SUGAR.

Specification forming part of Letters Patent No. 122,371, dated January 2, 1872.

Specification describing a new and useful Improvement in the Manufacture of Sugar, invented by GEORGE A. DRUMMOND and THOMAS STERRY HUNT, of Montreal, in the Province of Quebec, Canada.

This invention has for its object to remove iron or other injurious metal from sugar.

For this purpose we employ a mono-sulphide of one of the alkaline earths, such as calcium, strontium, or barium, in conjunction with sulphate of magnesia. To this end we proceed as follows: To the solution of sugar or the sirup we add milk of lime so as to make it slightly alkaline. We then add the prepared sulphide of barium, calcium, or strontium, either in powder, or, by preference, dissolved in water, and thoroughly stir the whole at the temperature of between 100° and 150° Fahrenheit. If the solution now gives a dark color to paper moistened with acetate of lead, the quantity of sulphide is sufficient. If not, more must be added. A quantity of sulphate of magnesia in solution is then added, at the rate of one and a half pounds for every pound of sulphide of barium, or for every one half pound of sulphide of calcium. The whole is thoroughly incorporated and heated. A small quantity of blood or albumen facilitates subsequent filtration. The whole is then passed through a filter, and is then ready for the subsequent processes of refining. The amount of sulphide to be used will depend upon the impurity of the sugar or sirup, but will not exceed, in most cases, two or three pounds of sulphide of barium, or about half that quantity of the sulphide of calcium, to the ton of sugar.

The theory of the process is as follows: The iron or other metal held in solution as oxides in the sirup are converted by the sulphide of the alkaline earth into sulphides, which are insoluble. The subsequent addition of the sulphate of magnesia converts any excess of the alkaline sulphuret into a very unstable sulphide of magnesium, while the baryta, if used, is separated as a wholly insoluble sulphate, which, with the sulphide of iron, &c., is separated by filtration.

The foregoing process may be varied, and the ordinary apparatus of sugar-refining is usually quite sufficient to carry it out effectually.

Having thus described our invention, we claim as new and desire to secure by Letters Patent—

The mono-sulphide of barium, strontium, or calcium, in conjunction with sulphate of magnesia, for the purification of sugar or sirup, substantially as set forth.

The above specification of our invention signed by us this 15th day of November, 1871.

GEORGE A. DRUMMOND.
THOMAS STERRY HUNT.

Witnesses:
O'HARA BAYEUS,
    *Of Montreal, Gentleman.*
JOHN C. GRIFFIN,
    *Of Montreal, Notary Public.* (155)